D. F. LASHER.
PROCESS FOR REFINING AND PURIFYING OILS.
APPLICATION FILED SEPT. 15, 1910.
1,075,481.  Patented Oct. 14, 1913.
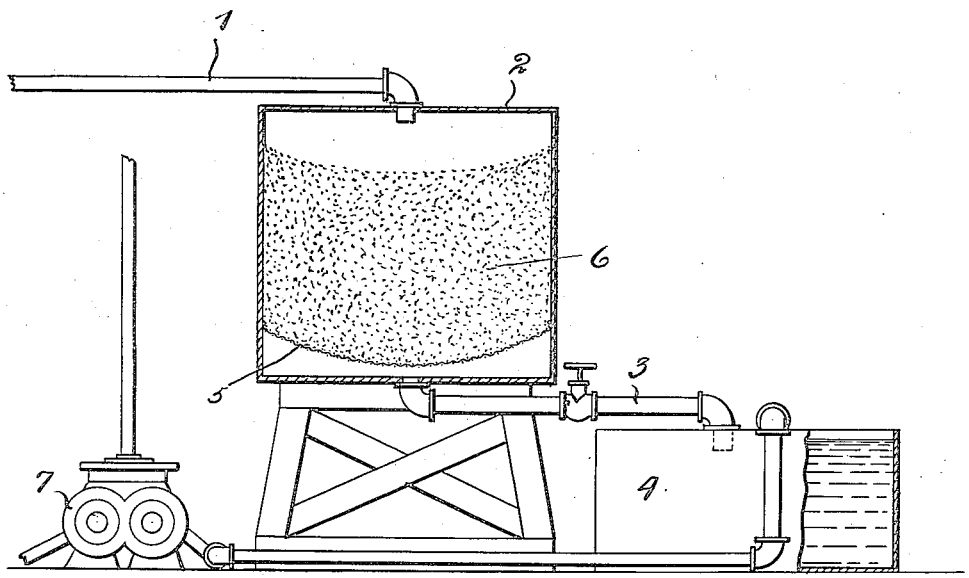

UNITED STATES PATENT OFFICE.

DAVID F. LASHER, OF ORANGE, TEXAS.

PROCESS FOR REFINING AND PURIFYING OILS.

1,075,481. Specification of Letters Patent. Patented Oct. 14, 1913.

Application filed September 15, 1910. Serial No. 582,260.

*To all whom it may concern:*

Be it known that I, DAVID F. LASHER, a citizen of the United States, residing at Orange, in the county of Orange and State of Texas, have invented certain new and useful Improvements in Processes for Refining and Purifying Oils, of which the following is a specification.

My invention relates to processes for purifying oils, especially petroleum, and has for its object the removal of impurities and the neutralization of acids, and the reduction of the cost of refining oil by simplifying the process and reducing the length of time usually required for accomplishing the purification.

The process of refining at present generally employed, consists in treating the oil with sulfuric acid to render it suitable for illuminating and heating purposes, after which the oil is allowed to stand so that the acid may settle to the bottom where it can be drawn off. The oil is then sprayed or otherwise washed with water to remove any acid which might not have settled, after which washing the oil is again allowed to stand to settle to the water out of the oil. After the water has been drawn off the oil is treated with a solution of caustic soda and allowed to stand to permit the solution to settle and be drawn off, after which it is again washed with water which is also settled and drawn off. During these steps of the process, while being treated successively with the acid and alkali, and being washed, the oil is agitated in any suitable manner to insure that every particle of it may be acted upon by these chemical agents. At the conclusion of these several treatments the oil is pumped from the agitator to vats for settling as it has been found in practice that it is impossible to remove every particle of the acid, alkali and water while the oil is in the agitator. This final settling in vats commonly requires from twenty-four to forty-eight hours and is known in the art as bleaching. After this final settling or bleaching, the oil is passed through a filtering medium to clean and brighten it.

My invention consists in the utilization of a hitherto waste product for a filtering medium, viz: the ashes of rice hulls. The use of this medium for filtering the oil after the final washing obviates the necessity of the final settling, thus effecting a considerable saving in time.

My improved process will be described in detail hereinafter and illustrated in the accompanying drawing which is a view of an apparatus employing my improved filtering medium.

Referring to the drawings, the numeral 1 designates a pipe which is adapted to convey the oil after the usual final washing from the agitator, not shown, to a filter employing my new medium. The filter comprises a tank 2 having a discharge pipe 3 communicating with the lower portion thereof and discharging into a suitable vat 4. Within the tank 2 is disposed a screen 5 or other support of foraminous material upon which is disposed my improved filtering medium 6, which consists of the ashes of rice hulls.

The numeral 7 indicates a pump which may be utilized for forcing the oil from the vat 4 to any suitable storage tank or any suitable receptacle for shipment, not shown.

The ashes of rice hulls are a waste product from the rice mills and are taken directly from the furnaces and placed in the filter. They are consequently thoroughly dry and therefore require no additional heating to drive out moisture.

The process as carried out with my improved filter involving the use of the ashes of rice hulls consists in treating the oil in the usual manner with sulfuric acid and an alkali and washing as previously described, and as is commonly the procedure, after which the oil may be passed from the agitator, (not shown) through the pipe 1 and through the filtering medium 6 disposed in the tank 2, and out through the pipe 3 into the vat 4. Owing to the nature and peculiarities of the ashes of burnt rice hulls, the oil is thus thoroughly clarified without the necessity for the usual final lengthy settling. It will thus be seen that a great saving of time is effected by the employment of my improved process.

Having thus described my invention what I claim is:

1. The process of filtering liquids consisting in passing the liquid through the ashes of rice hulls.

2. The process of refining petroleum consisting in treating it with acid and alkali, washing it to remove the acid and alkali, and then running the washed petroleum through rice hull ashes.

DAVID F. LASHER.

Witnesses:
Tom L. Cruse,
A. M. Watson.